United States Patent
Böttger et al.

[11] Patent Number: 6,083,857
[45] Date of Patent: *Jul. 4, 2000

[54] SURFACE ELEMENT

[75] Inventors: Kerstin Böttger, Zell; Regina Hoffmann, Münchberg; Peter Stöcker, Gefrees/Grünstein; Hermann Wolfrum, Münchberg, all of Germany

[73] Assignee: Helsa-Werke Helmut Sandler GmbH & Co. KG, Gefrees, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/875,513
[22] PCT Filed: Nov. 12, 1996
[86] PCT No.: PCT/DE96/02174
§ 371 Date: Jul. 11, 1997
§ 102(e) Date: Jul. 11, 1997
[87] PCT Pub. No.: WO97/18157
PCT Pub. Date: May 22, 1997

[30] Foreign Application Priority Data
Nov. 13, 1995 [DE] Germany ............ 195 42 210

[51] Int. Cl.⁷ .................. B32B 5/18; B32B 5/06
[52] U.S. Cl. .......... 442/370; 442/388; 442/389; 442/394; 442/373
[58] Field of Search ............... 442/370, 373, 442/388, 389, 394

[56] References Cited

U.S. PATENT DOCUMENTS

| | | |
|---|---|---|
| 4,192,086 | 3/1980 | Sichak . |
| 4,517,308 | 5/1985 | Ehlenz et al. . |
| 4,539,982 | 9/1985 | Bailly ............................ 602/3 |
| 4,542,739 | 9/1985 | Schafer et al. ................ 602/44 |
| 5,108,152 | 4/1992 | Reilly et al. ................ 297/482 |
| 5,237,769 | 8/1993 | Paire . |

FOREIGN PATENT DOCUMENTS

| | | |
|---|---|---|
| 0 151 018 A2 | 8/1985 | European Pat. Off. . |
| 0 493 082 A1 | 7/1992 | European Pat. Off. . |
| 2 475 982 | 8/1981 | France . |
| 31 18 999 A1 | 12/1982 | Germany . |
| 32 20 088 C1 | 9/1983 | Germany . |
| 37 04 529 A1 | 8/1988 | Germany . |
| 37 22 814 C2 | 1/1989 | Germany . |

*Primary Examiner*—Christopher Raimund
*Attorney, Agent, or Firm*—Hoffmann & Baron LLP

[57] ABSTRACT

Described is a surface element (10) which is provided for controlledly transporting moisture and for the storage of moisture and which has an air-permeable carrier (14) provided with an adsorbent. The surface element (10) also has an absorbent, moisture-storing fleece layer (12), wherein the adsorber carrier (14) and the fleece layer (12) are connected together in areal relationship by needling (16) to give an air-permeable composite material (22; 22'). The needling (16) is oriented from the fleece layer (12) towards the adsorber carrier (14). The fiber barbs (18) of the needling (16) extend from the fleece layer (12) to the adsorber carrier (14) and through the adsorber carrier (14). The fiber barbs (18) provide a wick action for the moisture, whereby moisture transport to the fleece layer (12) is optimized. Particularly upon saturation of the fleece layer (12) excess moisture is stored in the adsorbent of the adsorber carrier (14).

29 Claims, 1 Drawing Sheet

SURFACE ELEMENT

The invention concerns a surface element having an air-permeable carrier provided with an adsorbent.

Many areas in daily life such as in relation to seats and chairs, shoes, domestic textiles, clothing, sports uses or the like involve the problem of achieving a given comfortable atmosphere or climate. Seats such as vehicle seats, child safety seats, office chairs, upholstered seats or chairs or the like involve a sitting atmosphere or climate which often leaves much to be desired. In the case of shoes it is inter alia shoe inserts, the insole or the lining that influence or adversely affect the atmosphere or climate within the shoe. Domestic textiles can involve blankets, mattresses, incontinence products etc in which the atmosphere or climate often also leaves much to be desired. The atmosphere involved in connection with clothing in the form of work protective clothing, motorcycle clothing, ABC-clothing and the like also correspondingly leaves something to be desired. Sports uses involve for example rucksacks, rucksack supports, back cushions, joint protectors, gloves, helmets or the like. In these cases also the desired atmosphere often leaves something to be desired.

The above-mentioned atmosphere which often leaves something to be desired results from the fact that moisture produced by a person is not adequately carried away, that is to say transported away.

The object of the present invention is to provide a surface element of the kind set forth in the opening part of this specification, with which the moisture is carried away in the optimum fashion or which is suitable for absorbing and temporarily storing moisture in an optimum fashion or transporting moisture away from the respective source thereof so as to afford good climate comfort.

In a surface element of the kind set forth in the opening part of this specification, in accordance with the invention that object is attained in that the adsorber carrier is in the form of a surface or flat element which is connected in areal relationship to an absorbent, moisture-storing fleece layer by needling to give an air-permeable composite material, wherein the needling is oriented from the fleece layer to the adsorber carrier and the fiber barbs or burrs of the needling extend from the fleece layer to the adsorber carrier and through the latter.

The surface element according to the invention is advantageously suitable for transporting moisture generated by a moisture source to the adsorber carrier and to the fleece layer. In that situation the fleece layer is firstly saturated with moisture. At the same time moisture is stored in the adsorber carrier and in the absorbent of the adsorber carrier. After saturation of the fleece layer further excess moisture can be stored in the adsorber carrier and in the adsorbent of the adsorber carrier. If then at a later time the source of moisture is no longer present, that is to say it is separated from the surface element according to the invention, then regeneration of the surface element according to the invention occurs in an advantageous manner, that is to say moisture is given off by drying in the ambient atmosphere. At the same time this arrangement advantageously ensures that smells or odors are bound in by the adsorbent.

In the surface element according to the invention the adsorber carrier can comprise an open-pore foam material which is provided with adsorber particles. The foam material is preferably a plastic foam such as a PU-foam. The foam material may be provided with the adsorber particles at its external surface and in its interior, that is to say on the pore walls or in the pores. The adsorber particles can be provided in one grain size or grain fraction or in different grain sizes or fractions. The adsorber particles may involve activated carbon particles or other per se known adsorber particles such as zeolites or the like.

The adsorber carrier can also comprise a fleece material or a textile material and can be provided with suitable adsorber particles. A further possibility is that in the surface element according to the invention the adsorber carrier comprises for example an activated carbon fiber material. In this case therefore the adsorber carrier forms the adsorbent.

In the surface element according to the invention the adsorber carrier may be of a wall thickness of 0.5 to 5 mm. It will be appreciated that the adsorber carrier of the element according to the invention may also be of a different wall thickness.

The surface element according to the invention is positioned in relation to a source of moisture in such a way that the absorbent fleece layer is away from the moisture source. The said fleece layer may have a high viscose component. A fleece layer of that kind may have a weight in relation to surface area of between 50 and 200 $g/m^2$. In dependence on the respective area of use of the surface element according to the invention, it will be appreciated that the fleece layer may also be of a weight in relation to surface area, other than that just specified.

Depending on where the surface element according to the invention is used, the fleece layer may comprise a (highly) absorbent, moisture-receiving fiber material, preferably viscose, a flame-resistant fiber material, carbon fibers and/or activated carbon fibers or melt fibers or may have at least a proportion of melt fibers. It will be appreciated that other suitable fiber materials such as polyacrylic fibers or the like may also be used.

An air-permeable and moisture-permeable top material may be fixed to the top side of the composite material, that is remote from the fleece layer. That top material may be a textile surface or flat material, a leather or a synthetic leather material. The top material may be glued fast to the top side of the composite material, that is to say to the side of the surface element according to the invention, that is remote from the fleece layer, and thus to the side which is towards a possible source of moisture. That adhesive effect may be afforded by means of a spray adhesive, by means of an adhesive mesh or by means of another per se known adhesive procedure. In that respect the glueing action may be in point form, in line-like or grid-like configuration or the like in order not to adversely affect the air-permeability and moisture-permeability between the top material and the composite material.

According to the invention it is also possible for the top material to be fixed to the top side of the composite material by a lamination procedure. Laminating the materials together in that way can be effected for example by means of a per se known flame lamination procedure.

In the surface element according to the invention, an air-tight and moisture-tight foil may be fixed in areal relationship to the side of the surface element, that is remote from the adsorber carrier, that is to say to the side which faces away from or is remote from a possible source of moisture. It is particularly advantageous if said foil is formed by a water vapor-permeable and water-tight foil because that further improves the comfort of use of an article provided with the surface element according to the invention.

Like the top material referred to hereinbefore the foil can be fixed by glueing or fixed by a lamination operation to the side of the surface element according to the invention, that is remote from the source of moisture.

According to the invention the composite material can be combined with a support carrier material. This may be desirable for example when the surface element according to the invention is used as an insert in shoes. This may involve anatomically shaped inserts. A desired anatomical configuration can be achieved without difficulty by means of said support carrier material.

In a surface element of the kind last mentioned the support carrier material can be provided at the top side or at the inward side of the composite material or between the adsorber carrier and the fleece layer. Particularly when the support carrier material is located at the top side or between the adsorber carrier and the fleece layer of the composite material, it is necessary for the support carrier material to be air-permeable and moisture-permeable. That can be achieved for example by the above-mentioned needling operation or by virtue of the fiber barbs or burrs of the needling if the support carrier material itself comprises for example a closed-cell synthetic foam material.

As has already been mentioned, the surface element according to the invention permits optimum moisture transport away from a source of moisture which comes into contact with the surface element, with moisture being stored both in the fleece layer and also in the adsorber carrier. That transportation of moisture away from the source of moisture is produced or optimized in an advantageous fashion by virtue of the fiber burrs or barbs of the needling. In addition the needling advantageously substantially improves the level of flexibility in comparison with the flexibility of a composite material having layers which are glued together.

In the surface element according to the invention therefore the needling is of such a configuration that the fiber barbs or burrs pierce the adsorber carrier, affording rapid transportation of moisture from the top side of the surface element or the top material thereof through the adsorber carrier into the highly absorbent fleece layer by means of the fiber barbs or burrs which afford a wicking effect. The adsorber particles in the adsorber carrier provide for a further improved absorption of moisture. In addition they advantageously provide an excellent moisture storage effect so that a part of the moisture is already absorbed by the adsorber particles during transportation of the moisture into the absorbent fleece layer. As has already been stated above the adsorbers serve in particular to absorb and store the excess moisture, after saturation of the absorbent fleece layer.

The surface element according to the invention advantageously forms what can be referred to as a moisture regulating system. More specifically if there is no longer any moisture loading in respect of the moisture-loaded surface element, drying of the surface element occurs, that is to say the moisture is given off again due to the drying effect. Regeneration takes place automatically. Advantageously the adsorber carrier or the adsorbent of the adsorber carrier has an odor-binding effect. It will be appreciated that the odor binding action occurs not only during said regeneration period. That means that for example a person who uses an article provided with the surface element according to the invention experiences an increase in well-being, even over prolonged periods of time.

Further details, features and advantages will be apparent from the following description of embodiments of the surface element according to the invention of which portions are shown in the drawing and which are illustrated in greatly enlarged form but not true to scale. In the drawing:

BRIEF DESCRIPTION OF THE DRAWING

FIG. 1 shows an embodiment of the surface element 10 which has a fleece layer 12, or non-woven material layer 12, and an adsorber carrier 14, which are connected together by a needling 16. The adsorber carrier 14 is provided with an adsorbent. The needling 16 is oriented from the fleece layer 12 towards the adsorber carrier 14, wherein the fiber barbs or burrs 18 of the needling 16 extend from the fleece layer 12 to the adsorber carrier 14 and through the latter. Those fiber barbs or burrs 18 provide a wick action which affords optimum transportation of moisture from the top side through the surface element 10, that is to say to the adsorber carrier 14 and to the fleece layer 12.

Figure 1:
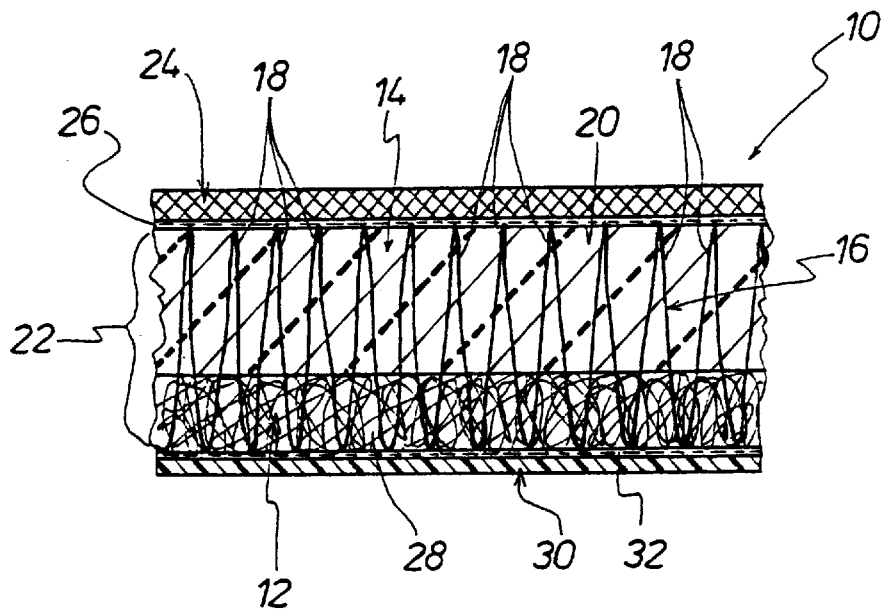
FIG. 1 shows a first embodiment of the surface element.

An air-permeable and moisture-permeable top material 24 is fixed to the top side 20, which is away from the fleece layer 12, of the composite material 22 comprising the fleece layer 12 and the adsorber carrier 14. That fixing action is afforded by an adhesive layer 26. This may involve a per se known lamination procedure.

A fluid-tight inner foil 30 is fixed to the inward side 28 of the composite material 22, which faces away from the adsorber carrier 14. That fixing action involves an adhesive layer 32 which is similar to the adhesive layer 26. This may also involve a lamination effect.

Figure 2:
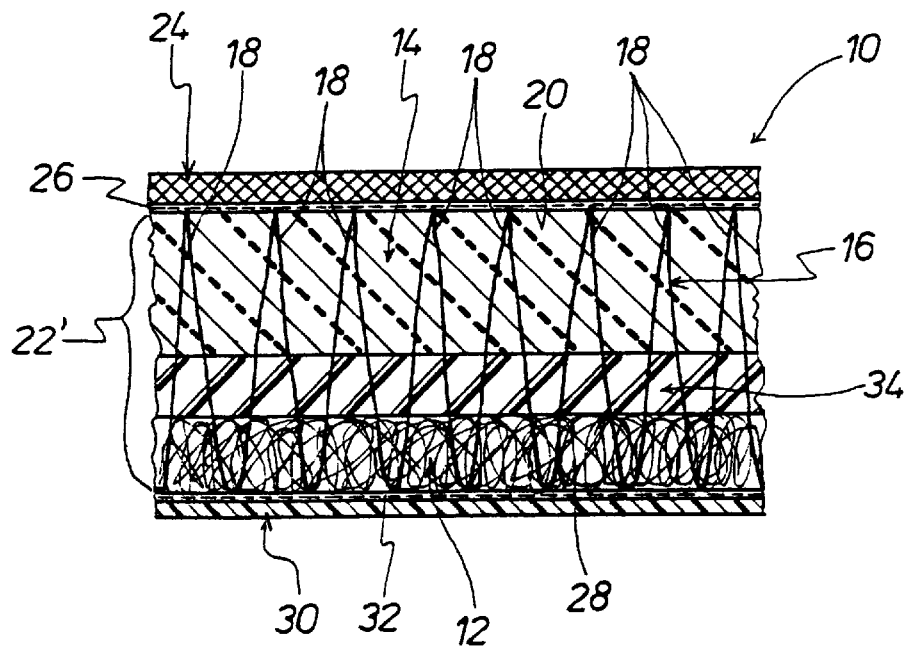
FIG. 2 shows a second element of the surface element.

FIG. 2 shows an embodiment of the surface element 10 which differs from the embodiment of the surface element 10 shown in FIG. 1 in that an areal support carrier material 34 is provided between the fleece or non-woven material layer 12 and the adsorber carrier 14. The support carrier material 34 may have cushioning properties. It may comprise a closed-cell plastic foam material which is made air-permeable and moisture-permeable by the needling 16. The support carrier material 34 is connected by means of the needling 16 to the fleece layer 12 and to the adsorber carrier 14 to form the composite material 22'.

The same details in FIG. 2 are denoted by the same references as those used in FIG. 1 so that there is no need for all those details to be described in detail once again, in connection with FIG. 2.

As has already been mentioned above, the surface element 10 can be used for example in connection with clothing or domestic textiles, shoes or shoe inserts, linings or the like, in connection with seats as an intermediate layer between the cushioning or upholstery core and the cover or similar uses.

What is claimed is:

1. A surface element comprising:
   an air-permeable adsorber carrier which is in the form of a surface element and having an adsorbent action, the adsorber carrier having a top surface for facing toward a moisture source and a bottom surface; and
   an absorbent, moisture-storing fleece layer which is connected in areal relationship to the bottom surface of the adsorber carrier by needling to form an air-permeable composite material, the needling extending from the bottom surface of the adsorber carrier through the top surface of the adsorber carrier and forming burrs on the top surface for transporting moisture between the top surface of the adsorber carrier and the moisture-storing fleece layer,
   wherein the adsorber carrier is a material selected from the group consisting of open-pore foam materials, fleece materials, textile materials, and activated carbon fiber materials.

2. A surface element as set forth in claim 1, wherein the adsorber carrier comprises an open-pore foam material with absorber particles.

3. A surface element as set forth in claim 1, wherein the adsorber carrier comprises a fleece material with absorber particles.

4. A surface element as set forth in claim 1, wherein the adsorber carrier comprises a textile material with absorber particles.

5. A surface element as set forth in claim 1, wherein the adsorber carrier comprises an activated carbon fiber material.

6. A surface element as set forth in claim 1 wherein the adsorber carrier has a wall thickness of between about 0.5 and about 5 mm.

7. A surface element as set forth in claim 1, wherein the fleece layer comprises an absorbent, moisture-receiving fiber material.

8. A surface element as set forth in claim 7, wherein the fleece layer has a weight in relation to surface area of between about 50 and about 200 g/m$^2$.

9. A surface element as set forth in claim 1, wherein the fleece layer comprises a flame-resistant fiber material.

10. A surface element as set forth in claim 1, wherein the fleece layer comprises carbon fibers.

11. A surface element as set forth in claim 1, wherein the fleece layer comprises activated carbon.

12. A surface element as set forth in claim 1, wherein the fleece layer comprises at least a proportion of melt fibers.

13. A surface element as set forth in claim 12, wherein the fleece layer consists of melt fibers.

14. A surface element as set forth in claim 1, including an air-permeable and moisture-permeable top material fixed to the top side of the composite material, that faces away from the fleece layer.

15. A surface element as set forth in claim 14, wherein the top material is formed by a material selected from a textile surface material, a leather material and a synthetic leather material.

16. A surface element as set forth in claim 15, wherein the top material is glued fast to the side of the surface element, that faces away from the fleece layer.

17. A surface element as set forth in claim 14, wherein the top material is fixed by a lamination procedure to the top side of the composite material.

18. A surface element as set forth in claim 1, including an air-tight and liquid-tight foil fixed in areal relationship to the side of the surface element, that faces away from the adsorber carrier.

19. A surface element as set forth in claim 18, wherein the foil is formed by a water vapor-permeable and water-tight foil.

20. A surface element as set forth in claim 18, wherein the foil is glued fast to the side of the surface element, that faces away from the adsorber carrier.

21. A surface element as set forth in claim 18, wherein the foil is fixed by a lamination procedure to the inward side of the composite material.

22. A surface element as set forth in claim 1, including a support carrier material with which the composite material is combined.

23. A surface element as set forth in claim 22, wherein the support carrier material is provided at the top side of the composite material.

24. A surface element as set forth in claim 22, wherein the support carrier material is at the inward side of the composite material.

25. A surface element as set forth in claim 22, wherein the support carrier material is between the absorber carrier and the fleece layer of the composite material.

26. A surface element comprising:

an air-permeable adsorber carrier which is in the form of a surface element and having an adsorbent action;

an absorbent, moisture-storing fleece layer which is connected in areal relationship to the adsorber carrier by needling to form an air-permeable composite material, and an air-tight and liquid tight foil fixed in areal relationship to the side of the surface element that faces away from the adsorber carrier, wherein the adsorber carrier is a material selected from the group consisting of open-pore foam materials, fleece materials, textile materials, and activated carbon fiber materials; and wherein the needling is oriented from the fleece layer to the adsorber carrier and the fiber burrs of the needling extend from the fleece layer to the adsorber carrier and through same.

27. A surface element as set forth in claim 26, wherein the foil is formed by a water vapor-permeable and water-tight foil.

28. A surface element as set forth in claim 26, wherein the foil is glued fast to the side of the surface element that faces away from the adsorber carrier.

29. A surface element as set forth in claim 26, wherein the foil is fixed by a lamination procedure to the inward side of the composite material.

\* \* \* \* \*